United States Patent
Song et al.

(10) Patent No.: US 7,280,708 B2
(45) Date of Patent: Oct. 9, 2007

(54) METHOD FOR ADAPTIVELY ENCODING MOTION IMAGE BASED ON TEMPORAL AND SPATIAL COMPLEXITY AND APPARATUS THEREFOR

(75) Inventors: Byung-cheol Song, Suwon-si (KR); Kang-wook Chun, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 672 days.

(21) Appl. No.: 10/357,370

(22) Filed: Feb. 4, 2003

(65) Prior Publication Data

US 2003/0169933 A1 Sep. 11, 2003

(30) Foreign Application Priority Data

Mar. 9, 2002 (KR) .................. 10-2002-0012727

(51) Int. Cl.
*G06K 9/32* (2006.01)
*G06K 9/46* (2006.01)

(52) U.S. Cl. .................. 382/299; 382/239

(58) Field of Classification Search ......... 382/172, 382/218, 232, 233, 236, 238, 239, 250, 251, 382/272, 299, 260, 305; 345/600–603; 348/400.1, 348/401.1, 404.1; 375/240.03, 240.08, 240.09, 375/240.25

See application file for complete search history.

(56) References Cited

U.S. PATENT DOCUMENTS

| | | | | |
|---|---|---|---|---|
| 5,432,893 A | * | 7/1995 | Blasubramanian et al. | . 345/600 |
| 5,544,284 A | * | 8/1996 | Allebach et al. | ............. 345/603 |
| 6,122,321 A | | 9/2000 | Sazzad et al. | |
| 6,229,925 B1 | * | 5/2001 | Alexandre et al. | .......... 382/239 |
| 6,650,705 B1 | * | 11/2003 | Vetro et al. | ............ 375/240.08 |
| 6,999,619 B2 | * | 2/2006 | Toda | .......................... 382/172 |
| 2003/0063806 A1 | * | 4/2003 | Kim et al. | ................... 382/236 |
| 2003/0169933 A1 | * | 9/2003 | Song et al. | ................. 382/239 |

FOREIGN PATENT DOCUMENTS

| | | |
|---|---|---|
| JP | 61-247183 | 11/1986 |
| JP | 63-108879 | 5/1988 |
| JP | 01-231583 | 9/1989 |
| JP | 01-300780 | 12/1989 |
| JP | 05-022710 | 1/1993 |
| JP | 10-112865 | 4/1998 |
| JP | 10-164579 | 6/1998 |
| WO | 02/01883 | 1/2002 |

OTHER PUBLICATIONS

Japanese Office Action for corresponding Japanese Patent Application No. 2003-015419 dated Aug. 22, 2006.

* cited by examiner

*Primary Examiner*—Amir Alavi
(74) *Attorney, Agent, or Firm*—Staas & Halsey LLP

(57) ABSTRACT

A method and an apparatus adaptively encode a motion image based on temporal and/or spatial complexity. In the method, encoding is performed with different temporal and spatial resolutions at frame rates based on the temporal and/or spatial complexity of an input image so that image data is stored with high efficiency. The method includes calculating a spatial complexity of input image data, determining a resolution by comparing the calculated spatial complexity with a predetermined threshold, and converting the resolution of the input image data based on the resolution.

13 Claims, 6 Drawing Sheets

METHOD FOR ADAPTIVELY ENCODING MOTION IMAGE BASED ON TEMPORAL AND SPATIAL COMPLEXITY AND APPARATUS THEREFOR

CROSS-REFERENCE TO RELATED APPLICATIONS

This application claims the benefit of Korean Application No. 2002-12727, filed Mar. 9, 2002, in the Korean Intellectual Property Office, the disclosure of which is incorporated herein by reference.

BACKGROUND OF THE INVENTION

1. Field of the Invention

The present invention relates to a motion image encoding apparatus and method, and more particularly, to a method for adaptively encoding a motion image based on temporal and spatial complexity and an apparatus therefor.

2. Description of the Related Art

As digital video recorders (DVRs) and personal video recorders (PVRs) have become popular and widely used, research on image compression techniques has been actively performed. However, since an image is compressed at a fixed resolution in the conventional DVR and PVR without considering temporal and spatial complexity, the efficiency of compression is low.

FIG. 1 is a block diagram of a conventional motion image encoding system. First, input image data is divided into 8×8 pixel blocks. In order to remove spatial correlation, a discrete cosine transform (DCT) unit 110 performs DCT operations on image data being input in units of 8×8 pixel blocks. By quantizing DCT coefficients obtained in the DCT unit 120, a quantization unit (Q) 120 expresses the DCT coefficients by some representative values such that high-efficiency lossy compression is performed. A variable length encoding (VLC) unit 130 entropy-codes the quantized DCT coefficients and outputs an entropy-coded data stream.

An inverse quantization (IQ) unit 140 inverse quantizes the image data that is quantized in the quantization unit 120. An inverse DCT (IDCT) unit 150 IDCT transforms the image data that is inversely quantized in the inverse quantization (IQ) unit 140. A frame memory unit 160 stores the image data that is IDCT transformed in the IDCT unit 150, in units of frames. A motion estimation (ME) unit 170 removes temporal correlations by using image data of a current frame that is being input and image data of a previous frame that is stored in the frame memory unit 160.

For data compression, an MPEG-2 encoder, as shown in FIG. 1, is used in conventional DVRs and PVRs. When input data is not compressed, the data is compressed through the MPEG-2 encoder and the bit stream is stored in a storage medium such as a hard disc drive (HDD) or a digital versatile disc (DVD). When input image data is a compressed bit stream, in order to generate an MPEG-2 stream with desired conditions by using a motion image transcoder shown in FIG. 2, MPEG-2 motion image is decoded and then, a predetermined scale and format transform is performed. Then, MPEG-2 motion image encoding is performed.

FIG. 2 is a block diagram of a conventional transcoding apparatus. When input image data is a compressed bit stream, image data is decoded by a motion image decoder 220 which comprises a variable length decoding (VLD) unit 222, an inverse quantization unit 224, an IDCT unit 226, a frame memory 228, and a motion compensation (MC) unit 230. Then, in order to generate an MPEG-2 stream with desired conditions, the motion image is encoded at a predetermined resolution by using the same MPEG-2 encoder as the motion image encoder shown in FIG. 1. This process is referred to as transcoding. When transcoding is performed, a scale and format transform unit 240 is used to reduce the scale of the image or convert the format of the image decoded by the motion image decoder 220, if necessary. Then, the MPEG-2 encoder 260 is used to perform MPEG-2 encoding at a predetermined resolution.

Thus, in the conventional MPEG-2 encoding, encoding is always performed with constant resolution. Accordingly, whether spatial complexity is large according to the characteristic of an input motion image or not, encoding is always performed with the same resolution. Also, even though a motion image has little temporal change, a high frame rate of 30 Hz is maintained, decreasing the efficiency of encoding.

SUMMARY OF THE INVENTION

An aspect of the present invention provides an adaptive motion image encoding method and apparatus to perform motion image encoding adaptively based on the characteristics of an input motion image so that encoding efficiency increases.

An aspect of the present invention also provides an adaptive motion image encoding method and apparatus to maximize an efficiency of storage when a motion image is stored in an HDD or DVD by using the MPEG-2 compression.

Additional aspects and advantages of the invention will be set forth in part in the description which follows and, in part, will be obvious from the description, or may be learned by practice of the invention.

According to an aspect of the present invention, an adaptive image encoding method is based on spatial complexity and comprises calculating a spatial complexity of input image data, determining a resolution by comparing the calculated spatial complexity with a predetermined threshold, and converting the resolution of the input image data based on the determined resolution.

According to another aspect of the present invention, an adaptive image encoding apparatus is based on spatial complexity and comprises a spatial complexity calculation unit which calculates a spatial complexity of input image data, a resolution determining unit which determines a resolution by comparing the calculated spatial complexity with a predetermined threshold, and a resolution converting unit which converts the resolution of input image data based on the determined resolution.

According to still another aspect of the present invention, an adaptive image encoding method is based on temporal complexity, and comprises calculating a temporal complexity of input image data, determining a frame rate by comparing the calculated temporal complexity with a predetermined threshold, and converting the frame rate of the input image data based on the determined frame rate.

According to still another aspect of the present invention, an adaptive motion image encoding apparatus is based on temporal complexity and comprises a temporal complexity calculation unit which calculates a temporal complexity of input image data, a frame rate determining unit which determines a frame rate by comparing the calculated temporal complexity with a predetermined threshold, and a frame rate converting unit which converts the frame rate of input image data based on the determined frame rate.

BRIEF DESCRIPTION OF THE DRAWINGS

These and/or other aspects and advantages of the invention will be become apparent and more readily appreciated from the following description of the preferred embodiments, taken in conjunction with the accompanying drawings of which.

DETAILED DESCRIPTION OF THE PREFERRED EMBODIMENTS

Figure 1:
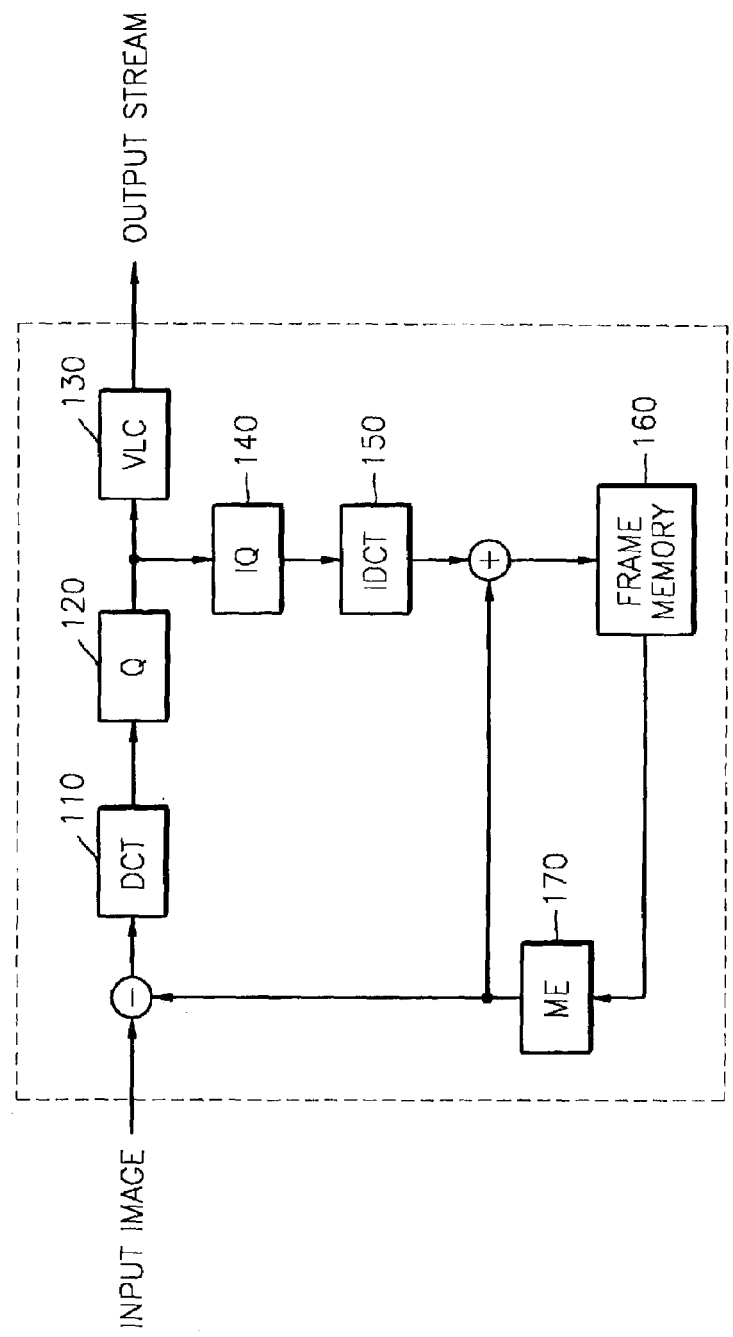
FIG. 1 is a block diagram of a conventional motion image encoding system.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

The desirability of an image compression technique for the purpose of storage lies in whether a given image is compressed with high efficiency. In the conventional DVR and PVR, an image is compressed at a predetermined resolution and then stored.

The present invention solves the problems occurring when an image is compressed at a predetermined resolution and stored. According to an embodiment of the present invention, considering that temporal and spatial complexity may be large or small, according to the characteristics of an input motion image, encoding is performed in units of groups of pictures (GOPs) with different spatial and temporal resolutions according to the spatial and temporal complexity of an input image, so that high efficiency in storage can be achieved.

After decoding, a GOP having low spatial complexity is expanded through interpolation and is then displayed. A GOP having low temporal complexity, that is, having little motion, is encoded at a lower frame rate so that encoding efficiency increases.

Referring to the accompanying drawings, embodiments of the present invention will now be explained.

Figure 3:
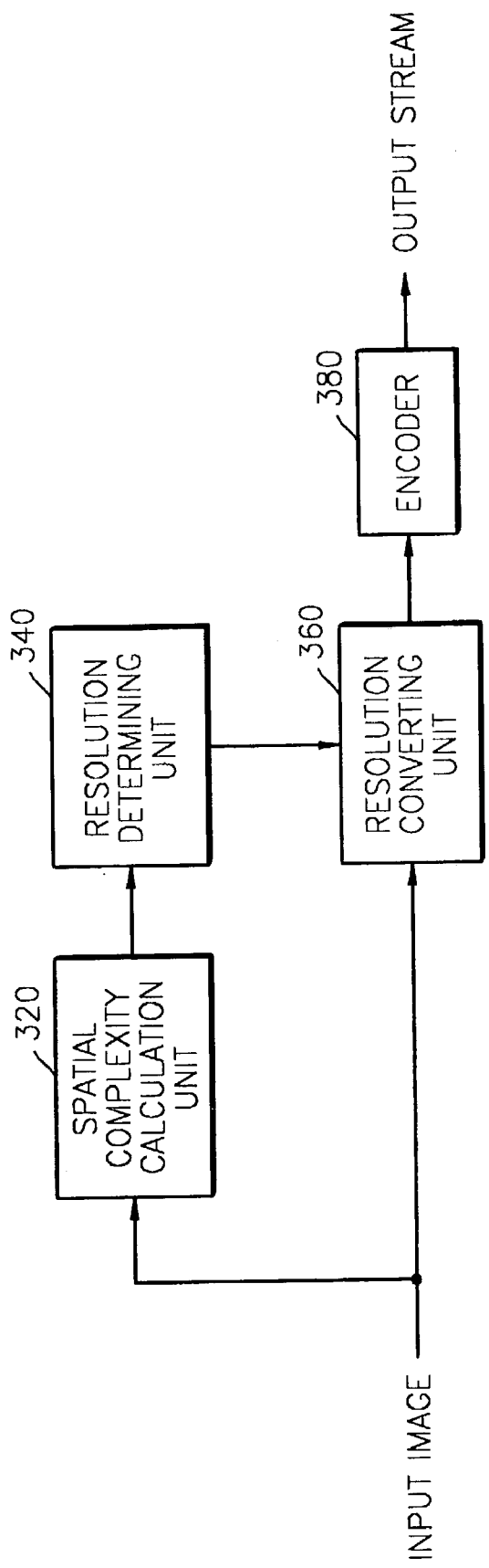
FIG. 3 is a block diagram of an adaptive motion image encoding apparatus based on spatial complexity, according to an embodiment of the present invention.

FIG. 3 is a block diagram of an adaptive motion image encoding apparatus based on spatial complexity, according to an embodiment of the present invention. The motion image encoding apparatus comprises a spatial complexity calculation unit 320, a resolution determining unit 340, a resolution converting unit 360, and an encoder unit 380, which are connected sequentially, that is, in a cascade connection.

The spatial complexity calculation unit 320 obtains dispersion values in units of 8×8 blocks for input images in units of GOPs and calculates an average of the dispersion values. Though the average dispersion value is obtained in units of GOPs in the present embodiment, an average dispersion value can be obtained selectively for other units.

The resolution determining unit 340 compares the average dispersion value, which is calculated in the spatial complexity calculation unit 320, with a predetermined threshold and determines a resolution in units of GOPs. For example, if an average dispersion value calculated in spatial complexity calculation unit 320 is greater than the predetermined threshold, MPEG-2 encoding is performed for this GOP with a predetermined original resolution. If the average dispersion value calculated in the spatial complexity calculation unit 320 is less than or equal to the predetermined threshold, resolution of each picture of this GOP is lowered, for example, by half in each direction, and then MPEG-2 encoding is performed for this GOP.

Though in the present embodiment, the spatial complexity is calculated in units of GOPs and then the resolution is determined, spatial complexity may be selectively calculated for other units, for example, in units of sequences and then the resolution is determined. Also, though the resolution is changed for MPEG-2 encoding in the present embodiment, this can be applied selectively to encoding methods other than the MPEG-2.

Here, the predetermined threshold may be determined initially considering the system environments such as a buffer and memory capacity, or may be determined arbitrarily by a user according to the types of input images.

Also, instead of using a fixed threshold, a threshold may selectively be determined adaptively. For example, whether to increase resolution may be determined by an accumulated average which is obtained from dispersion values of the previous 8×8 block units. For example, if a unit dispersion value of a GOP is greater than an accumulated average, MPEG-2 encoding is performed for the GOP with an originally desired resolution. If the unit dispersion value of the GOP is less than or equal to the accumulated average, resolution of each picture of the GOP is lowered, for example, by half in each direction, and then MPEG-2 encoding is performed for the GOP. Selectively, the threshold can be determined by multiplying an accumulated average by a predetermined constant value α. In this case, by appropriately determining a constant value a, resolution is lowered, so that the ratio of the GOP to be encoded can be adjusted.

When the above method is performed, encoding can begin only after one GOP delay, i.e., one GOP delay is required. In order to avoid or reduce the delay, a resolution may be determined by obtaining an average dispersion value for only the first picture of each GOP. The delay can be determined appropriately by a user considering a trade-off between performance and delay.

Figure 2:
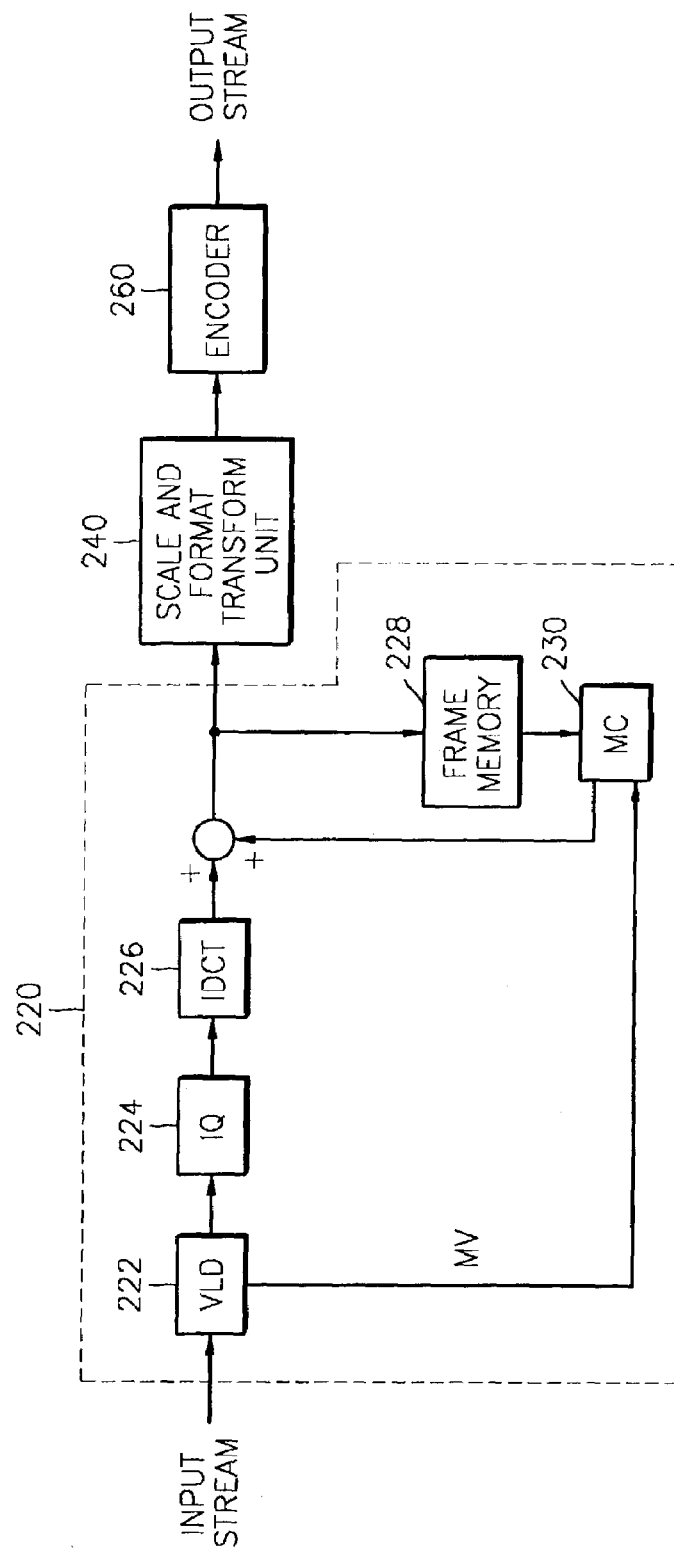
FIG. 2 is a block diagram of a conventional transcoding apparatus.
Figure 4:
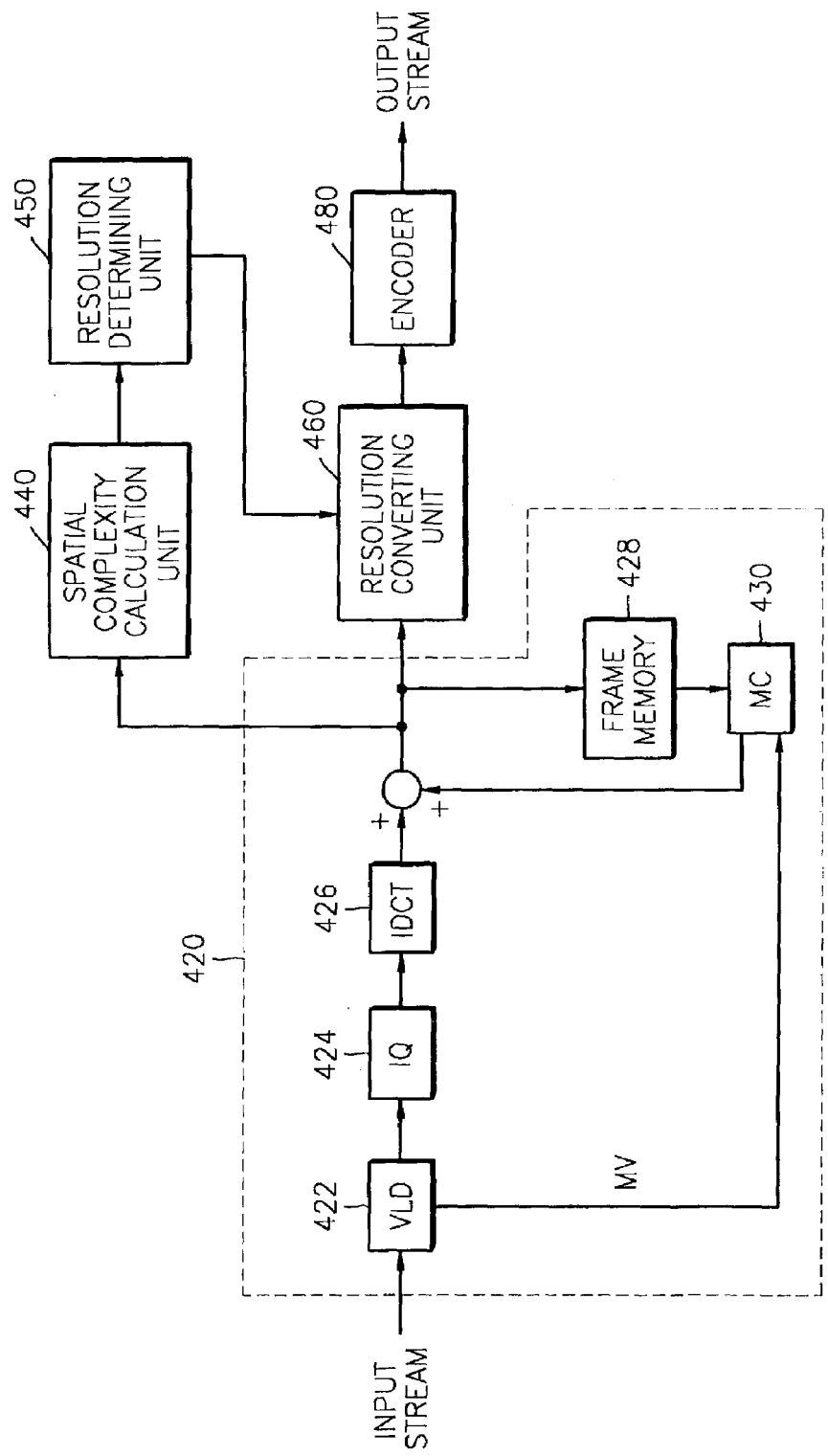
FIG. 4 is a block diagram of an adaptive transcoding apparatus based on spatial complexity, according to another embodiment of the present invention.

FIG. 4 is a block diagram of an adaptive transcoding apparatus based on spatial complexity according to an embodiment of the present invention. The transcoding apparatus of FIG. 4 comprises a motion image decoder 420, a spatial complexity calculation unit 440, a resolution determining unit 450, a resolution converting unit 460, and an encoder unit 480. The motion image decoder 420 comprises a variable length decoding (VLD) unit 422, an inverse quantization (IQ) unit 424, an IDCT unit 426, a frame memory 428, and a motion compensation (MC) unit 430. Here, the motion image decoder 420 and the encoder unit 480 perform the same functions as in the conventional motion image transcoding apparatus shown in FIG. 2, and therefore, a detailed explanation thereof will be omitted.

When input image data is in a compressed stream, the input image data is decoded in the VLD unit 422. Regardless of the frame type such as I, B, and P, the spatial complexity calculation unit 440 obtains a dispersion value in units of 8×8 blocks in a spatial domain for an input image and calculates an average in units of GOPs. Though an average dispersion value is obtained in units of GOPs in the present embodiment, an average dispersion value may be obtained selectively for other units, for example, in units of sequences.

The resolution determining unit 450 compares the average dispersion value calculated in the spatial complexity calculation unit 440 with a predetermined threshold and determines the resolution of a current GOP. For example, if an average dispersion value calculated in the spatial complexity calculation unit 440 is greater than the predetermined threshold, MPEG-2 encoding is performed for this GOP with a predetermined original resolution. If the average dispersion value calculated in the spatial complexity calculation unit 440 is less than the predetermined threshold, resolution of each picture of this GOP is lowered, for example, by half in each direction, and then MPEG-2 encoding is performed for this GOP.

Though the spatial complexity is calculated in units of GOPs and then the resolution is determined in the present embodiment, the spatial complexity may be selectively calculated for other units, for example, in units of sequences and then the resolution is determined. Also, though the resolution is changed for MPEG-2 encoding in the present embodiment, this can be applied selectively to encoding methods other than the MPEG-2.

Here, the predetermined threshold may be determined initially considering the system environments such as a buffer and memory capacity, or may be determined arbitrarily by a user according to the types of input images.

Also, instead of using a fixed threshold, a threshold may be determined adaptively. For example, whether to increase the resolution may be determined, by an accumulated average which is obtained from dispersion values of all the previous 8×8 block units.

When the above method is performed, encoding can begin only after one GOP delay, i.e., one GOP delay is required. In order to avoid or reduce the delay, the resolution may be determined by obtaining an average dispersion value for only the first picture of each GOP. The delay can be determined appropriately by a user considering a trade-off between performance and delay.

The above method is a transcoding method, that is, a bit stream is changed in order to increase the efficiency of storage. A bit stream may be stored after transformation with a different bit rate, a different resolution, or a different standard to satisfy the purpose of the original transcoding.

Also, just like the high efficiency storage by encoding data at different resolutions based on the spatial complexity as described above, data may be stored with high efficiency by changing frame rates based on temporal complexity.

Figure 5:
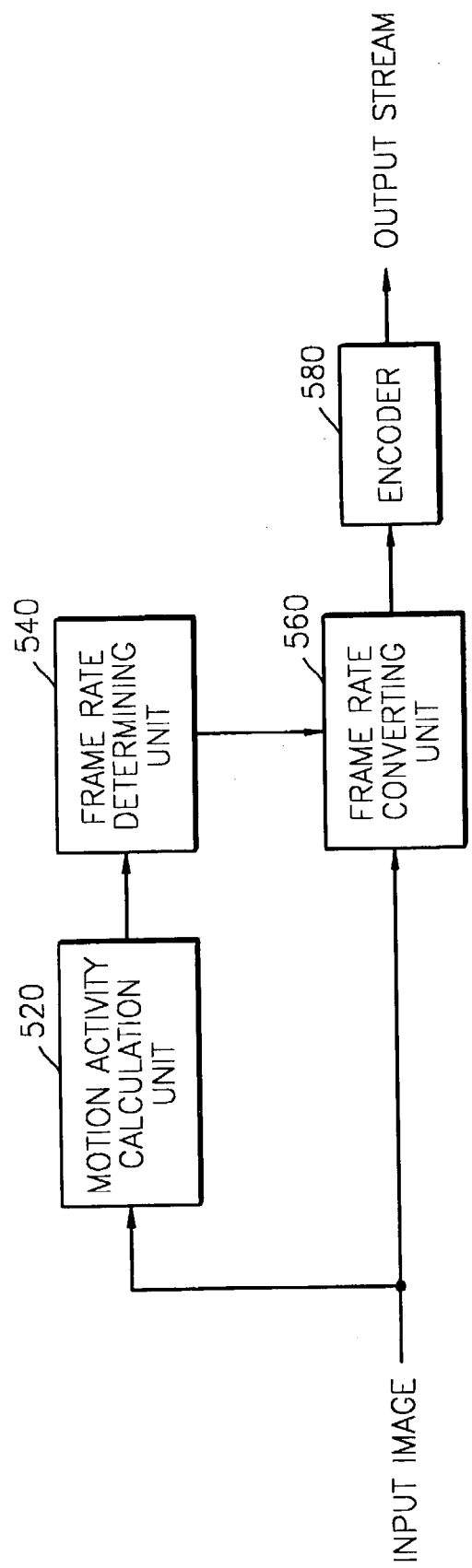
FIG. 5 is a block diagram of an adaptive motion image encoding apparatus based on temporal complexity, according to an embodiment of the present invention.

FIG. 5 is a block diagram of an adaptive motion image encoding apparatus based on temporal complexity, according to an embodiment of the present invention. The motion image encoding apparatus according to the present invention comprises a motion activity calculation unit 520, a frame rate determining unit 540, a frame rate converting unit 560, and an encoder unit 580.

The motion activity calculation unit 520 obtains motion vectors for all macro blocks in a GOP, calculates motion activities based on the motion vectors, and calculates an average motion activity of macro blocks. In the present embodiment, if a motion vector (MV) of a macro block is (MV1, MV2), the motion activity of the macro block is defined as $MV1^2+MV2^2$.

The frame rate determining unit 540 compares an average motion activity, which is calculated in the motion activity calculation unit 520, with a predetermined threshold, and determines a frame rate for the GOP and performs encoding. By appropriately adjusting the threshold, a variety of frame rate adjusting methods can be carried out. Also, a plurality of thresholds may be utilized and a frame rate may be adjusted after comparing a motion activity with the thresholds. For example, a method can be designed such that when determined thresholds are 10 and 20, if the motion activity is less than 10, a frame rate of 10 Hz is selected, if the motion activity is less than 20, a frame rate of 20 Hz is selected, and if the motion activity is equal to or greater than 20, a frame rate of 30 Hz is selected. However, in order to prevent problems caused by a sudden change of a motion (image jerkiness), when a motion activity is very close to 0, the frame rate of the corresponding GOP may be adjusted to be relatively low.

The frame rate converting unit 560 adjusts the frame rate of input image data according to the frame rate determined in the frame rate determining unit 540 and outputs the result to the encoder unit 580.

Figure 6:
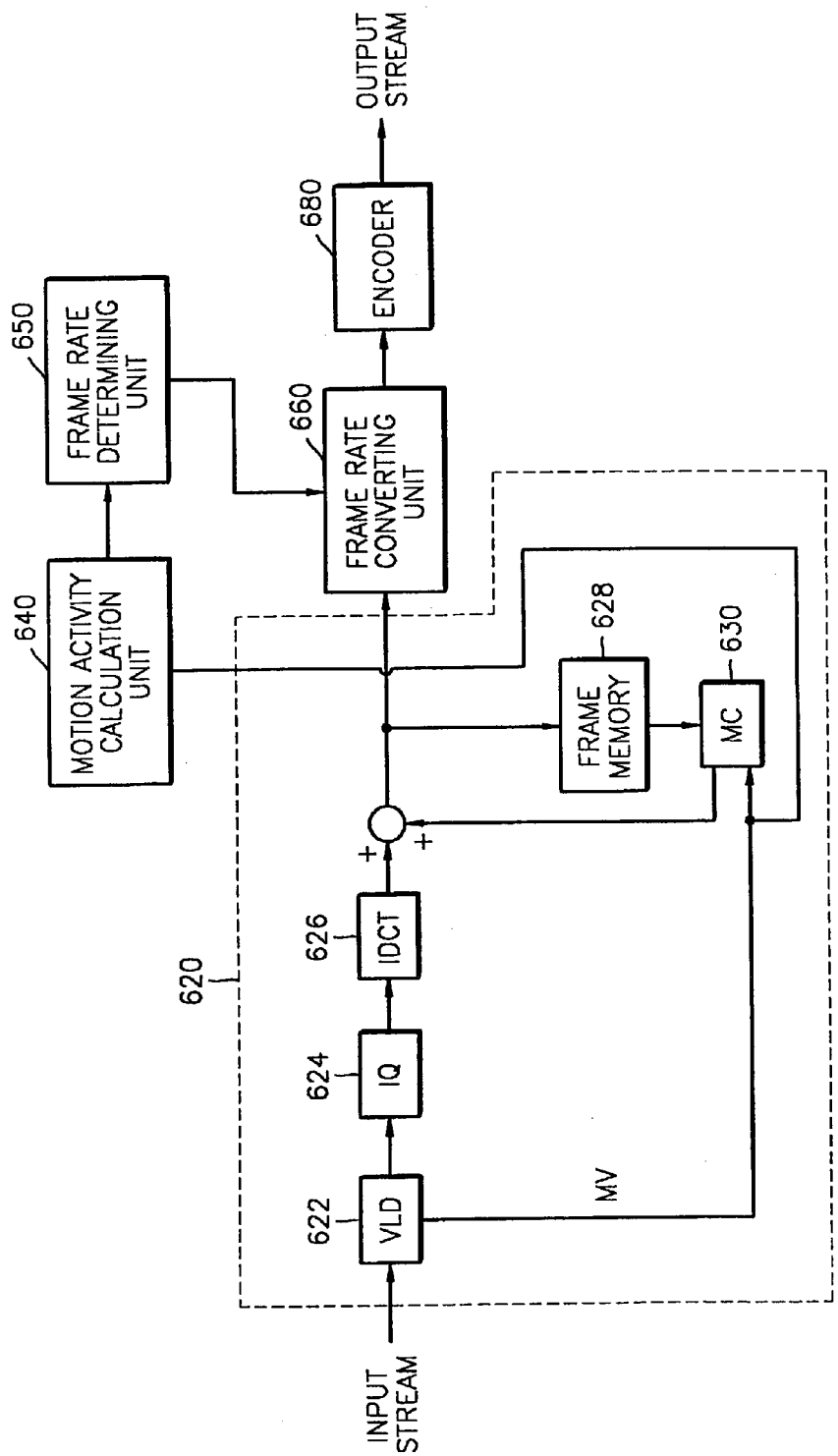
FIG. 6 is a block diagram of an adaptive transcoding apparatus based on temporal complexity, according to another embodiment of the present invention.

FIG. 6 is a block diagram of an adaptive transcoding apparatus based on temporal complexity according to an embodiment of the present invention. The adaptive transcoding apparatus of FIG. 6 comprises a motion image decoder 620, a motion activity calculation unit 640, a frame rate determining unit 650, a scale transforming unit 660, and an encoder unit 680. The motion image decoder 620 comprises a variable length decoding (VLD) unit 622, an inverse quantization (IQ) unit 624, an IDCT unit 626, a frame memory 628, and a motion compensation (MC) unit 630.

When input image data is in a compressed stream, the motion activity calculation unit 640 calculates motion activities in units of GOPs by using motion vector information obtained in the decoding step of the compressed stream. For example, in the embodiment of the present invention shown in FIG. 6, the motion activity calculation unit 640 receives motion vectors (MVs) output from the variable length decoding unit 622 and calculates a motion activity of each macro block based on the motion vectors.

In an MPEG-2 stream, a sequence header is followed by a GOP header. Generally, a sequence header is placed once in front of the entire sequence and a GOP header is placed in front of each GOP. Image size information is placed in each sequence header. However, in an actual broadcast, a sequence header is transmitted for each GOP unit when an MPEG-2 stream is transmitted. Accordingly, if a sequence header is put into each GOP unit when encoding is performed, decoding can be performed without any problem.

The present invention is not limited to the embodiments described above, and it is apparent that variations and modifications by those skilled in the art can be effected within the spirit and scope of the present invention defined in the appended claims.

Also, the present invention may be embodied in a program code, which can be read by a computer, on a computer readable recording medium. The computer readable recording medium includes all kinds of recording apparatuses on which computer readable data are stored. The computer readable recording media includes storage media such as magnetic storage media (e.g., ROM's, floppy disks, hard disks, etc.), optically readable media (e.g., CDROMs, DVDs, etc.) and carrier waves (e.g., transmissions over the Internet). Also, the computer readable recording media may be transmitted to computer systems connected through a network and can store and execute a computer readable code in a distributed mode.

According to the present invention as described above, temporal and spatial complexity of an image is calculated in units of GOPs, and a GOP having a relatively low temporal and spatial complexity is encoded with a resolution lower than the original resolution, while a GOP having a relatively high temporal and spatial complexity is encoded with the original resolution so that the motion image can be stored in a storage medium more efficiently.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An adaptive image encoding method based on spatial complexity comprising:
    calculating a spatial complexity of input image data;
    determining a resolution by comparing the spatial complexity with a predetermined threshold; and
    determining an outputted resolution of the input image data based on the resolution,
    wherein a lower spatial complexity corresponds to a lower resolution.

2. The method of claim 1, wherein the spatial complexity is calculated based on an average dispersion value for each block of the input image data.

3. The method of claim 1, wherein the calculating the spatial complexity and determining the resolution are performed in units of groups of pictures (GOPs) of the input image data.

4. The method of claim 1, wherein the calculating the spatial complexity and determining the resolution are performed in units of sequences of the input image data.

5. The method of claim 1, wherein if the input image data is encoded image data, the spatial complexity is calculated based on decoded data of the input image data.

6. The method of claim 1, wherein if the input image data is encoded image data, the spatial complexity is calculated based on dispersion values obtained from inverse discrete cosine transform (IDCT)-transformed data and motion compensated data.

7. A computer-readable medium having stored thereon computer-executable instructions for performing the method of claim 1.

8. An adaptive image encoding apparatus based on spatial complexity, comprising:
    a spatial complexity calculation unit which calculates a spatial complexity of input image data;
    a resolution determining unit which determines a resolution by comparing the spatial complexity with a predetermined threshold; and
    a resolution converting unit which determines an outputted resolution of input image data based on the resolution,
    wherein a lower spatial complexity corresponds to a lower resolution.

9. The apparatus of claim 8, wherein the spatial complexity is calculated based on an average dispersion value for each block of the input image data.

10. The apparatus of claim 8, wherein the calculation of the spatial complexity in the spatial complexity calculation unit and the determination of the resolution in the resolution determining unit are performed in units of groups of pictures (GOPs) of the input image data.

11. The apparatus of claim 8, wherein the calculation of the spatial complexity in the spatial complexity calculation unit and the determination of the resolution in the resolution determining unit are performed in units of sequences of the input image data.

12. The apparatus of claim 8, wherein, if the input image data is encoded image data, the spatial complexity is calculated based on decoded data of the input image data.

13. The apparatus of claim 8, wherein, if the input image data is encoded image data, the spatial complexity is calculated based on dispersion values obtained from IDCT-transformed data and motion compensated data.

* * * * *

UNITED STATES PATENT AND TRADEMARK OFFICE
CERTIFICATE OF CORRECTION

PATENT NO. : 7,280,708 B2
APPLICATION NO. : 10/357370
DATED : October 9, 2007
INVENTOR(S) : Byung-cheol Song et al.

It is certified that error appears in the above-identified patent and that said Letters Patent is hereby corrected as shown below:

Title Page, Column 1 item 56 (U.S. Patent Documents), Line 1, after "et al." delete ".".

Signed and Sealed this

Nineteenth Day of February, 2008

JON W. DUDAS
*Director of the United States Patent and Trademark Office*